United States Patent
Cheng et al.

(10) Patent No.: US 7,938,237 B2
(45) Date of Patent: May 10, 2011

(54) BRAKE STRUCTURE FOR A MAIN SHAFT OF A DIRECT DRIVE TORQUE MOTOR

(75) Inventors: Fu-Yuan Cheng, Taichung (TW); Chih-Hsien Chao, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 950 days.

(21) Appl. No.: 11/833,230

(22) Filed: Aug. 2, 2007

(65) Prior Publication Data
US 2009/0032363 A1    Feb. 5, 2009

(51) Int. Cl.
*B66B 11/08* (2006.01)

(52) U.S. Cl. ........ 188/264 D; 188/67; 188/74; 188/358; 188/365; 188/367; 192/12 C; 192/18 A; 192/48.8; 192/56.33; 192/85.53; 192/85.54; 310/73; 310/93

(58) Field of Classification Search .......... 188/72.4, 188/73.46, 73.47, 74–76, 151 R, 264 D, 358, 188/366; 92/75; 192/18 A; 279/2.03–2.09; 310/68 B, 77, 52, 75 D, 79, 80, 89, 90, 92, 310/93, 98
See application file for complete search history.

(56) References Cited

U.S. PATENT DOCUMENTS

| | | | | |
|---|---|---|---|---|
| 2,055,325 A * | 9/1936 | Woolson | ................... | 188/151 R |
| 2,115,551 A * | 4/1938 | Farmer | ........................ | 188/365 |
| 2,257,610 A * | 9/1941 | Kraft | .............................. | 477/25 |
| 2,400,587 A * | 5/1946 | Livers | .......................... | 244/111 |
| 4,989,909 A * | 2/1991 | Bouligny et al. | ......... | 294/119.3 |

* cited by examiner

*Primary Examiner* — Robert Siconolfi
*Assistant Examiner* — San Aung

(57) ABSTRACT

A brake structure for a main shaft of a direct drive torque motor comprises a body, a direct drive torque motor, a main shaft and a brake assembly. The main shaft is provided for fixing the torque motor and the body, and the brake assembly is mounted between the body and the main shaft. An annular brake oil room of the brake assembly is positioned against the main shaft, and the brake seat subassembly has a thinner brake deformation wall formed between the annular brake oil room and the main shaft. The annular brake oil room utilizes its high pressure caused deformation to the brake deformation wall, thus achieving a braking effect by pressing the main shaft. Thereby, the present invention is easy to assemble, and not only can stop the main shaft quickly, but also has a greater locking force.

3 Claims, 4 Drawing Sheets

BRAKE STRUCTURE FOR A MAIN SHAFT OF A DIRECT DRIVE TORQUE MOTOR

BACKGROUND OF THE INVENTION

1. Field of the Invention

The present invention relates to a brake structure for a main shaft of a direct drive torque motor, and more particularly to a brake structure for a main shaft of a direct drive torque motor which is easy to assemble and not only can stop the main shaft quickly, but also has a greater locking force.

2. Description of the Prior Art

Nowadays, motor device is used more and more widely in the field of industry, which mainly includes the types of outer rotor, inner rotor and so on. In addition to the effect of high precision, the motor device also has low friction loss, high energy conversion efficiency and low noise. Therefore, the motor device is very important in terms of various machines.

Currently, direct drive torque motor is applied to the drive of the axis equipments: such as the automatic equipment, the indexing plate and different kinds of tool machines. A main shaft of a conventional direct drive torque motor is merely located in a center of the inner rotor and is controlled by the rotation of the direct drive torque motor, and such a conventional direct drive torque motor still has the following disadvantages:

Firstly, the conventional direct drive torque motor utilizes the power of the torque motor to stop the main shaft. The main shaft still cannot stop immediately since it still has rotation inertia force when the torque motor is stopped, it is hard to control when applying to the products of angle controlling, rotating speed controlling and precision controlling.

Secondly, when the conventional direct drive torque motor stops at any angle after rotating, the working objects or cutting tools driven by the main shaft will lose power immediately, just like losing supporting force, such that the torque motor cannot bear a greater cutting strength. In that case, there is no locking force on the objects driven by the main shaft. To solve the above-mentioned problems, a brake structure for a main shaft of a direct drive torque motor which can stop immediately and improve the locking force is developed.

The present invention has arisen to mitigate and/or obviate the afore-described disadvantages.

SUMMARY OF THE INVENTION

The primary objective of the present invention is to provide a brake structure for a main shaft of a direct drive torque motor which can stop immediately and is precisely controllable.

To achieve the object of the present invention, the brake structure for a main shaft of a direct drive torque motor comprises a body, a direct drive torque motor, a main shaft and a brake assembly. The brake assembly is mounted between the body and the main shaft, an annular brake oil room of the brake assembly is positioned against the main shaft, and the brake seat subassembly has a thinner brake deformation wall formed between the annular brake oil room and the main shaft. The annular brake oil room utilizes its high pressure caused deformation to the brake deformation wall, thus achieving a braking effect by pressing the main shaft. Thereby, the present invention is easy to assemble and can stop the main shaft quickly.

The second objective of the present invention is to provide a brake structure for a main shaft of a direct drive torque motor which has a brake locking force.

Since the annular brake oil room of the present invention utilizes its high pressure caused deformation to press the main shaft, thus producing a braking effect. Thereby, the main shaft and the components mounted on the main shaft thereof will be supported by the pressing force of the brake deformation wall when a braking action is performed, so the present invention has a greater locking force.

It is to be noted that the annular brake oil room is located in a brake seat subassembly that includes a L-shaped seat and a cover, and the annular brake oil room is formed between the L-shaped seat and the cover and sealed by the O-shaped ring, so as to simplify the structure and to reduce the cost of manufacturing the annular brake oil room.

The brake seat subassembly is fixed to a front end of the body and is disposed with a plurality of O-shaped rings, thus preventing the oil from being overflowed. Moreover, when replacing the pressure oil of the annular brake oil room, the oil can be discharged from the oil pressure interface.

Further, the above-mentioned brake assembly can be assembled between the body and the main shaft, and the oil pressure interface formed in the side of the body is connected to the annular brake oil room and the pressure source, such that the annular brake oil room can be deformed or can restore its shape at any time, so as to press the main shaft and to produce a braking effect.

In addition, the present invention is detachable and adapted for modular application, so the quantity and position of the bearings and the bearing seats mounted between the body and the main shaft have no relation to the characteristic of the present invention. Thereby, the bearings and bearing seat of different sizes and shapes such as an ordinary ball or a roller bearing are applicable to the present invention.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
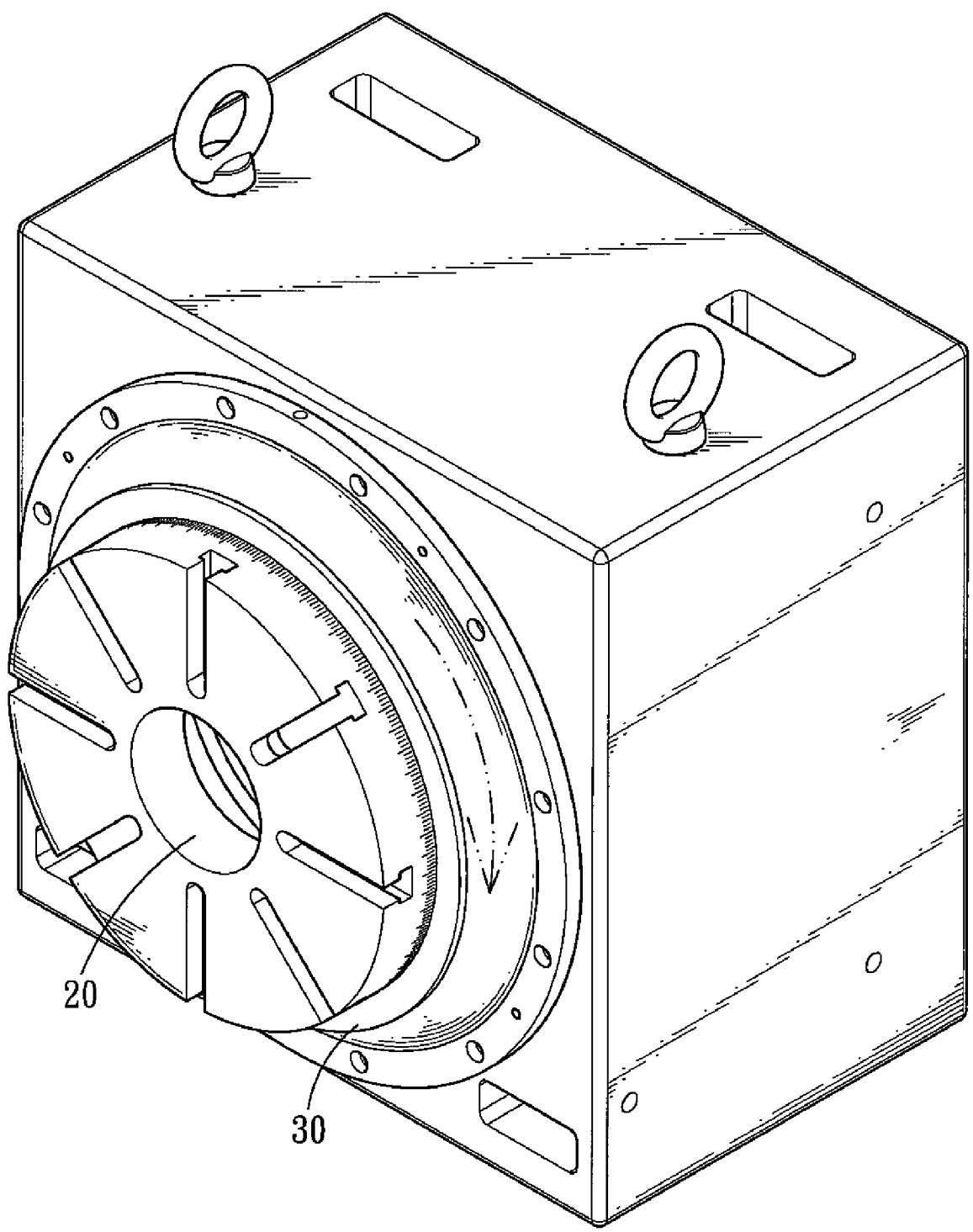
FIG. 1 is a perspective view of a brake structure for a main shaft of a direct drive torque motor in accordance with the present invention.
Figure 2:
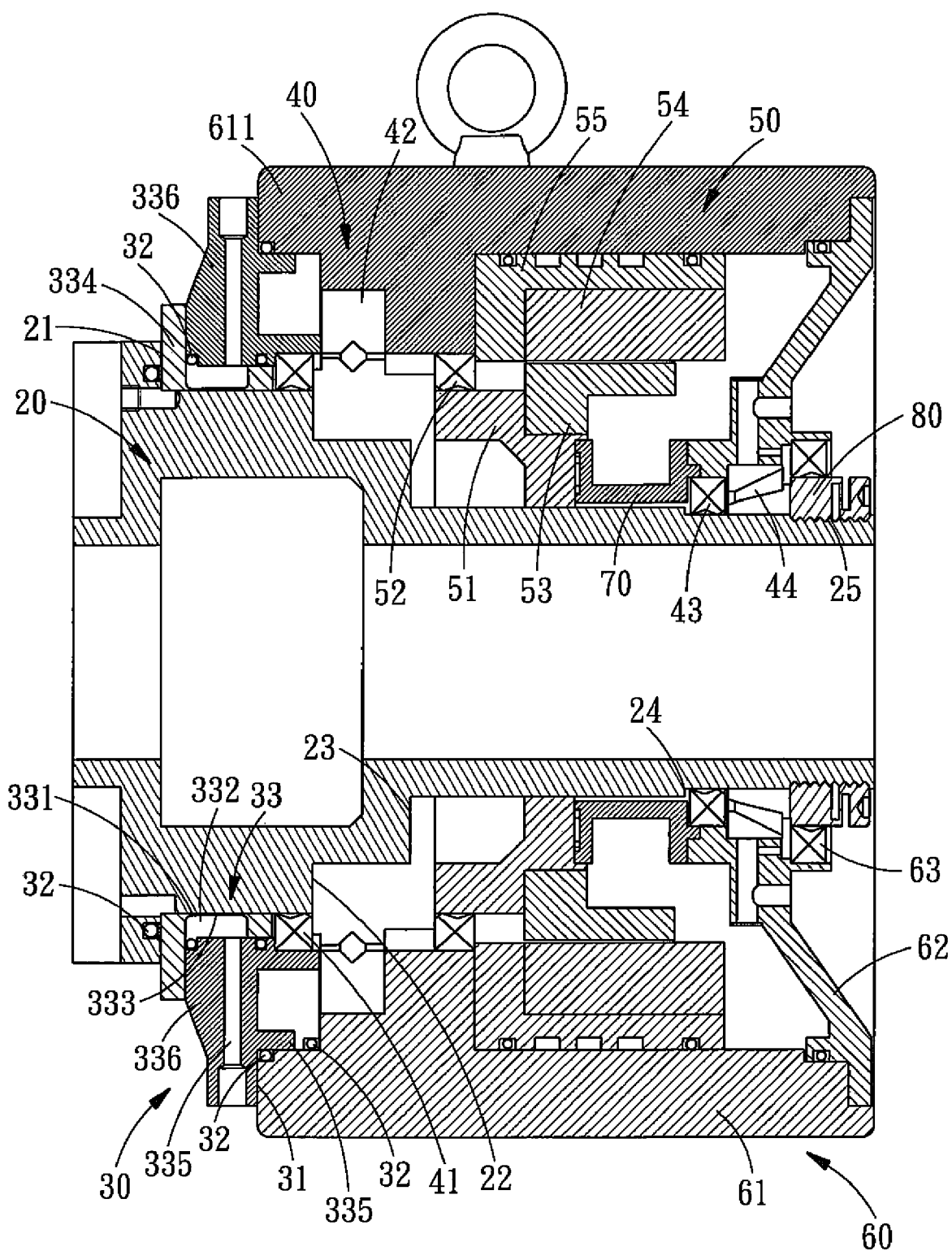
FIG. 2 is an assembly cross sectional view of the brake structure for a main shaft of a direct drive torque motor in accordance with the present invention.
Figure 3:
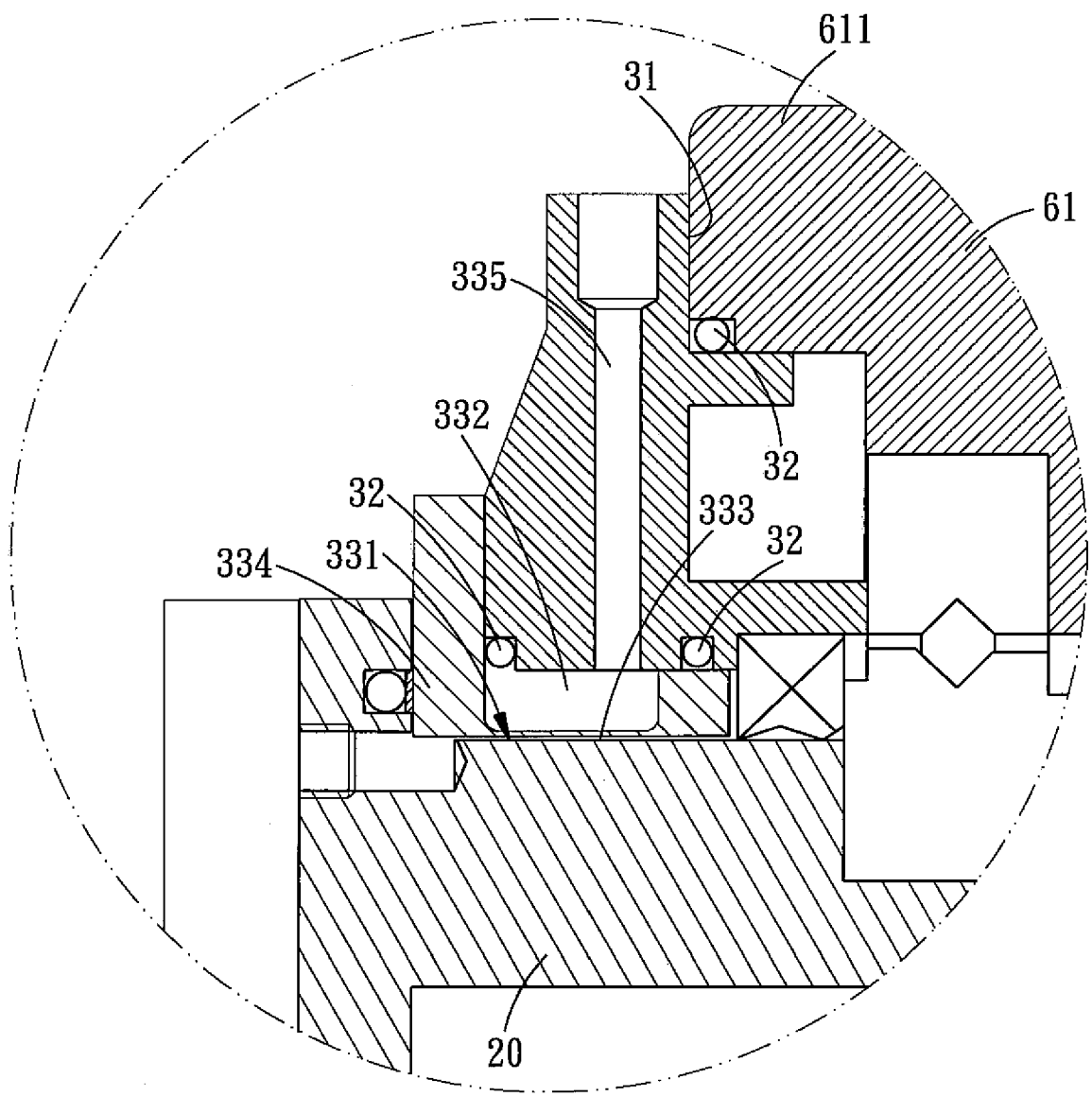
FIG. 3 is an enlarged cross sectional view of a brake assembly in accordance with the present invention.

Referring to FIGS. 1-3, a brake structure for a main shaft of a direct drive torque motor in accordance with the present invention comprises a main shaft 20, a brake assembly 30, a bearing assembly 40, a direct drive torque motor 50, a body 60, a position-sensing member 70 and an adjustment nut 80.

A first stage 21, a second stage 22, a third stage 23, a fourth stage 24, and an outer thread portion 25 are orderly tapered from one end to the other end of an outer surface of the main shaft 20, and the outer thread portion 25 is located at one end of the main shaft 20.

The brake assembly 30 includes a brake seat subassembly 33 and a plurality of O-shaped rings 32. The brake seat subassembly 33 includes a L-shaped seat 334 and a cover 336. An annular brake oil room 332 is formed between the L-shaped seat 334 and the cover 336 and sealed by the O-shaped ring 32. In a center of the brake seat subassembly 33 is defined a hole 331 for insertion of the main shaft 20, an inner side of the brake seat subassembly 33 is positioned against the first stage 21 of the main shaft 20, and a positioning portion 31 is formed in an outer side of the brake seat subassembly 33. The annular brake oil room 332 is defined in an inner periphery of the hole 331, and the break seat subassembly 33 has a thinner brake deformation wall 333 formed between the annular brake oil room 332 and the main shaft 20. The O-shaped rings 32 are disposed between the L-shaped seat 334 and the cover 336, and at the positions against the main shaft 20 and the positioning portion 31, respectively. An oil hole 335 which opens outward is defined in the annular brake oil room 332 and is connected to a pressure source (the direction of the pressure source is indicated by arrow).

The bearing assembly 40 includes a first oil seal 41, a main bearing 42, a second oil seal 43 and an assistant roller bearing 44. The first oil seal 42 is mounted between the brake assembly 30 and the main shaft 20, and the main bearing 42 is located on the second stage 22 of the main shaft 20 and is positioned against the brake assembly 30. The second oil seal 43 is located on the third stage 23 of the main shaft 20. The assistant roller bearing 44 is a tapered roller bearing which is located on the fourth stage 24 and is positioned against the second oil seal 43.

The direct drive torque motor 50 includes a mover-fixing seat 51, a mover oil seal 52, a mover 53, a stator 54 and a motor-cooling seat 55. The mover-fixing seat 51 is positioned against one side of the main bearing 42 of the bearing assembly 40, the mover oil seal 52 and the mover 53 are fixed outside the mover-fixing seat 51, and the stator 54 is fixed in the motor-cooling seat 55 and is mounted on the mover 53.

The body 60 includes a shell member 61, a rear cover 62 and a rear cover oil seal 63. The shell member 61 is fixed with the rear cover 62, one end of the body 60 is fixed with the positioning portion 31 of the brake assembly 30, and the body 60 and the main shaft 20 are positioned by the main bearing 42 of the bearing assembly 40. The rear cover 62 is fixed outside the second oil seal 43 and the assistant roller bearing 44 of the bearing assembly 40, and the rear cover oil seal 63 is disposed on the inner side of the bottom of the rear cover 62. The shell member 61 is located outside the body 60 for accommodation of all the above-mentioned members and used for fixing the motor-cooling seat 55 of the direct drive torque motor 50.

The position-sensing member 70 is fixed on the rear cover 62 of the body 60 and is provided for sensing the changes of the rotation position of the main shaft 20.

The adjustment nut 80 is screwed on the outer thread portion 25 defined at one end of the main shaft 20 and is located in the rear cover oil seal 63 of the body 60, and the adjustment nut 80 is adjusted to press tightly against the assistant roller bearing 44 of the bearing assembly 40. The adjustment nut 80 is designed with an anti-loose structure, such a structure is of conventional techniques and will not be described in detail.

Figure 4:
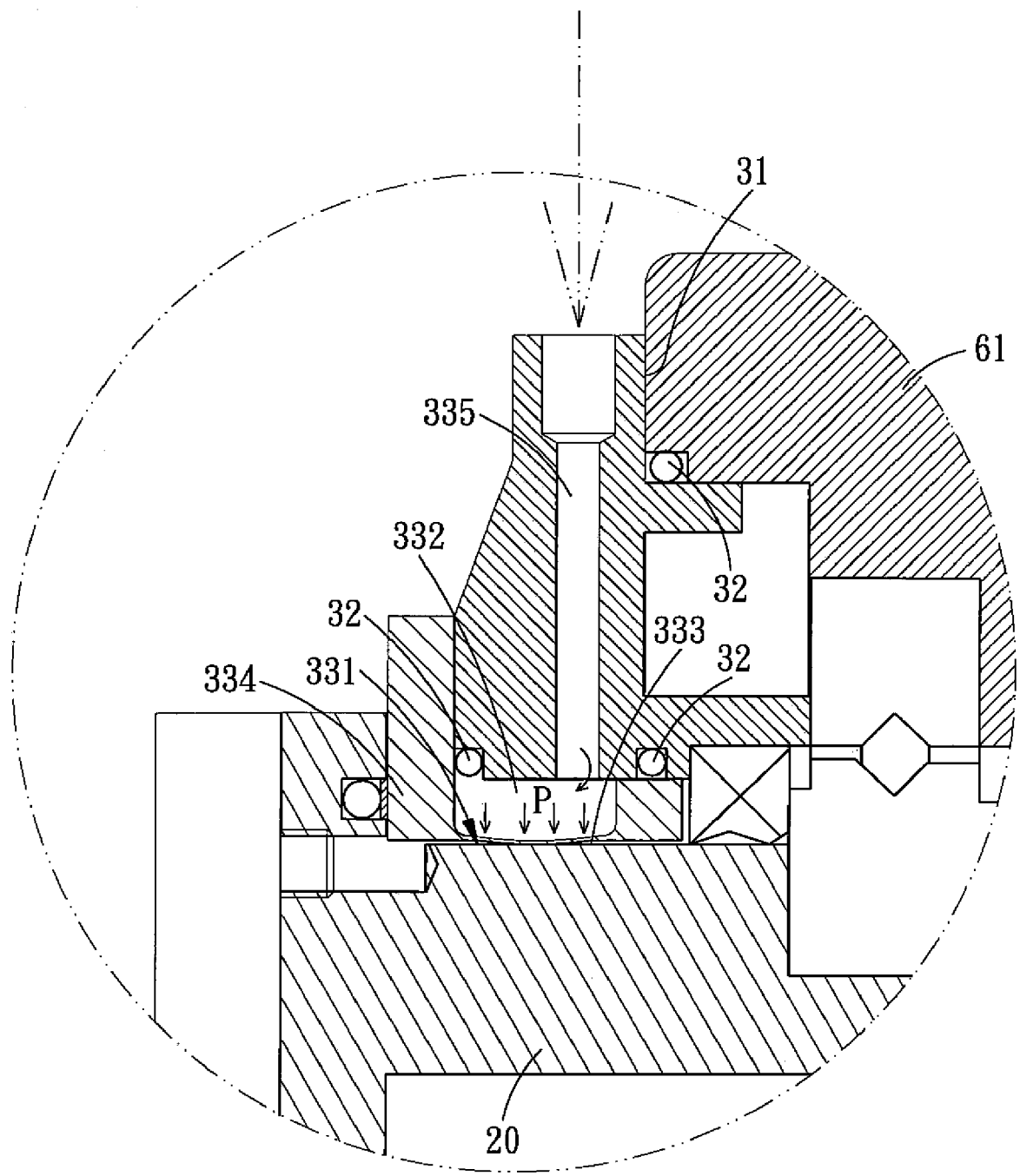
FIG. 4 is an illustrative view of showing the working of the brake assembly.

For a better understanding of the present invention, its operations and functions, reference should be made to FIGS. 3 and 4:

In the center of the brake seat subassembly 33 is defined a hole 331 for insertion of the main shaft 20, the annular brake oil room 332 is defined in the inner periphery of the hole 331, and the break seat subassembly 33 has the thinner brake deformation wall 333 formed between the annular brake oil room 332 and the main shaft 20, so as to obtain the increased pressure from the pressure source. In addition, the thinner brake deformation wall 333 will be deformed inward by the annular brake oil room 332, such that the main shaft 20 will be stopped immediately by the brake deformation wall 333, thus achieving a braking effect by pressing the main shaft 20. Thereby, the present invention can stop the main shaft 20 quickly by the brake assembly 30 that is easy to assemble.

Further, when the annular brake oil room 332 obtains the decompression from the pressure source via the oil hole 335, the thinner brake deformation wall 333 will be recovered and will stop pressing the main shaft 20, so the main shaft 20 can be rotated at any time when it is not braked.

Referring to FIG. 4, it is to be noted that the main shaft 20 is stopped by the inward deformation of the thinner brake deformation wall 333, and the thinner brake deformation wall 333 presses the main shaft 20 from periphery to inside. At the same time, the thinner brake deformation wall 333 presses the main shaft 20 from periphery to inside to provide enough supporting force, so that the components assembled on the main shaft 20 can be supported stably, and the main shaft 20 can bear a greater cutting strength.

To summarize, a brake structure for a main shaft of a direct drive torque motor of the present invention mainly comprises a body, a direct drive torque motor, a main shaft and a brake assembly. The main shaft is provided for fixing the torque motor and the body, and the brake assembly is mounted between the body and the main shaft. An annular brake oil room of the brake assembly is positioned against the main shaft, and the brake seat subassembly has a thinner brake deformation wall formed between the annular brake oil room and the main shaft. The annular brake oil room utilizes its high pressure caused deformation to the brake deformation wall, thus achieving a braking effect by pressing the main shaft. Thereby, the present invention is easy to assemble, and not only can stop the main shaft quickly, but also has a greater locking force.

While we have shown and described various embodiments in accordance with the present invention, it should be clear to those skilled in the art that further embodiments may be made without departing from the scope of the present invention.

What is claimed is:

1. A brake structure for a main shaft of a direct drive torque motor, comprising:
a body;
a direct drive torque motor mounted in the body;
a main shaft assembled in the direct drive torque motor; and
a brake assembly being disposed between the body and the main shaft and having a brake oil room, a brake deformation wall being formed in the brake oil room and located correspondingly to a direction of the main shaft, the brake oil room utilizing its high pressure caused deformation to the brake deformation wall for achieving a braking effect by pressing the main shaft,
wherein the brake oil room of the brake assembly positioned against the main shaft is annular-shaped, and the brake assembly includes a brake seat subassembly and a plurality of O-shaped rings, in a center of the brake seat subassembly is defined a hole for insertion of the main shaft, a positioning portion is formed in an outer side of the brake seat subassembly for fixing the body, the annular brake oil room is defined in an inner periphery of the hole, the brake deformation wall is formed between the annular brake oil room and the main shaft, the plurality of O-shaped rings is disposed at the positions against the main shaft and the positioning portion, an oil hole opens outward and is defined in the annular brake oil room.

2. The brake structure for a main shaft of a direct drive torque motor as claimed in claim 1, wherein the brake seat subassembly includes a L-shaped seat and a cover, and the annular brake oil room is formed between the L-shaped seat and the cover and sealed by the O-shaped ring.

3. The brake structure for a main shaft of a direct drive torque motor as claimed in claim 1, wherein a first stage, a second stage, a third stage, a fourth stage, and an outer thread portion are orderly tapered from one end to the other end of an outer surface of the main shaft;

a bearing assembly includes a first oil seal, a main bearing, a second oil seal and an assistant roller bearing, the first oil seal is mounted between the brake assembly and the main shaft, the main bearing is located on the second stage of the main shaft and is abutted against the brake assembly, the second oil seal is located on the third stage of the main shaft, the assistant roller bearing is located on the fourth stage and is abutted against the second oil seal;

the direct drive torque motor includes a mover-fixing seat, a mover oil seal, a mover, a stator and a motor-cooling seat, the mover-fixing seat is positioned against one side of the main bearing of the bearing assembly, the mover oil seal and the mover are fixed outside the mover-fixing seat, the stator is installed in the motor-cooling seat and is located outside the mover;

the body includes a shell member, a rear cover and a rear cover oil seal, the shell member is fixed with the rear cover, one end of the body is fixed with the positioning portion of the brake assembly, the body and the main shaft are positioned by the main bearing of the bearing assembly, the rear cover is fixed outside the second oil seal and the assistant roller bearing of the bearing assembly, the rear cover oil seal is disposed on an inner side of a bottom of the rear cover, the shell member is located outside the body for accommodation of all the above-mentioned members and used for fixing the motor-cooling seat of the direct drive torque motor; and a position-sensing member is fixed on the rear cover of the body and is provided for sensing rotation position changes of the main shaft.

\* \* \* \* \*